(12) United States Patent
Hoffmann et al.

(10) Patent No.: US 6,793,760 B2
(45) Date of Patent: Sep. 21, 2004

(54) CLEANING AGENT FOR PVC SURFACES

(75) Inventors: Horst Hoffmann, Bonfingen (DE); Karl-Heinz Rogmann, Ratingen (DE); Joerg Gehrke, Dresden (DE); Horst Kleinert, Ottendorf-Okrilla (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 10/617,972

(22) Filed: Jul. 11, 2003

(65) Prior Publication Data

US 2004/0103986 A1 Jun. 3, 2004

Related U.S. Application Data

(62) Division of application No. 09/623,949, filed as application No. PCT/EP99/01367 on Mar. 3, 1999, now abandoned.

(30) Foreign Application Priority Data

Mar. 12, 1998 (DE) .......................... 198 10 663

(51) Int. Cl.⁷ .............................. B32B 31/00
(52) U.S. Cl. ............................ 156/272.6; 156/272.2; 156/273.3; 156/275.7; 156/281; 156/331.7; 510/421; 510/433; 510/435; 510/436; 510/506
(58) Field of Search ................ 156/281, 272.2, 156/272.6, 273.3; 510/166, 188, 421, 433, 435, 436, 499, 506

(56) References Cited

U.S. PATENT DOCUMENTS

| | | | |
|---|---|---|---|
| 5,206,992 A | * 5/1993 | Carlson et al. ......... 29/895.32 |
| 5,254,290 A | 10/1993 | Blandiaux et al. | |
| 5,494,707 A | * 2/1996 | Wang et al. ............. 427/412.1 |
| 5,879,495 A | * 3/1999 | Evans ......................... 156/82 |
| 5,929,016 A | 7/1999 | Harrison | |
| 6,046,150 A | 4/2000 | Choy et al. | |
| 6,090,771 A | 7/2000 | Burt et al. | |
| 6,582,655 B2 | * 6/2003 | Botsolas et al. ............. 422/28 |
| 2002/0089173 A1 | * 7/2002 | Reidy ......................... 283/74 |

FOREIGN PATENT DOCUMENTS

| | | |
|---|---|---|
| DE | 218 776 | 2/1985 |
| DE | 38 07 668 | 9/1989 |
| DE | 43 43 468 | 6/1995 |
| DE | 44 28 382 | 2/1996 |
| JP | 04/259387 | 9/1992 |
| JP | 10/012584 | 1/1998 |
| WO | WO 95/25138 | 9/1995 |
| WO | WO 97/29084 | 8/1997 |

OTHER PUBLICATIONS

Habenichts, "Kleben: Grundlagen, Technologie, Anwendung", Springer–Verlag, 3$^{rd}$ edition (1997), p.495–512.

Database WPI Week 9813 Derwent Publications Ltd. AN98–136449 XP002108526.

Database WPI Week 9243 Derwent Publications Ltd. AN92–259387 XP002108527.

\* cited by examiner

*Primary Examiner*—Mark A. Osele
(74) *Attorney, Agent, or Firm*—Stephen D. Harper; Michael E. Carmen

(57) ABSTRACT

The invention relates to a method for adhesive bonding a PVC surface comprising cleaning a PVC surface with an aqueous alkaline cleaning composition and applying an adhesive to the cleaned PVC surface.

17 Claims, No Drawings

CLEANING AGENT FOR PVC SURFACES

CROSS REFERENCE TO RELATED APPLICATIONS

This application is a divisional of U.S. application Ser. No. 09/623,949 filed Oct. 27, 2000 now abandoned which claims priority under 35 U.S.C. ∈371 of PCT International Application No. PCT/EP99/01367, filed Mar. 3, 1999 which claims priority to German Application No. 198 10 663.7, filed Mar. 12, 1998.

BACKGROUND OF THE INVENTION

The invention relates to a cleaning agent for PVC surfaces and its use, in particular for cleaning before subsequent adhesive bonding.

It is well known that surface treatment before adhesive bonding has a decisive influence on the quality of the adhesion of a subsequent coating or adhesive bond. It includes a) surface preparation by cleaning, improving the suitability and degreasing and b) surface pretreatment by mechanical, physical, chemical or electrochemical means such as corona treatment, flame treatment and the application of adhesion promoters or primers (compare Habenichts "Kleben: Grundlagen, Technologie, Anwendung" Springer-Verlag, $3^{rd}$ edition (1997), pages 495 to 512).

Chlorinated hydrocarbons, such as methylene chloride, are used for treating the surfaces of PVC articles. However, these cleaning agents endanger the environment. To eliminate this disadvantage, it has been suggested in DE 43 43 468 to prepare PVC profiles by ionic/multi-ionic corona treatment for subsequent adhesive bonding with a PU melt adhesive followed by the application, by calendering, of a PVC film. In this way, bond strengths are achieved which are at least as good as those achieved by cleaning with chlorinated hydrocarbons.

However, both surface treatments can be improved with respect to the durability of the adhesive bond, e.g. under the influence of heat and climatic changes.

A requirement consequently existed for a surface treatment for PVC articles, in particular PVC profiles, without the use of chlorinated hydrocarbons, in order to improve the durability of the adhesion of both an adhesive bond and a coating.

SUMMARY OF THE INVENTION

The solution is indicated in the claims. It consists essentially of an aqueous alkaline cleaning agent having the following composition:

A) 2 to 30 wt. % of a compound having an alkaline reaction in an aqueous medium,
B) 1 to 30 wt. % of a complexing agent,
C) 5 to 40 wt. % of a compound with at least one hydroxyl group,
D) 1 to 15 wt. % of a surfactant based on fatty alcohols,
E) 1 to 30 wt. % of a rinsing auxiliary agent,
F) 0 to 8 wt. % of water-soluble colorants and builders,
G) 20 to 80 wt. % of water.

The percentage by weight relates to the cleaning agent as a whole. However, it is also possible to prepare a stock solution in high concentration which is then diluted, before use, to the indicated concentration by the addition of water. The quantities indicated must always add up to give 100 wt. %.

DESCRIPTION OF THE PREFERRED EMBODIMENTS

A compound having an alkaline reaction in an aqueous medium should be understood to mean both strong and weak, both volatile and fixed compounds having an alkaline reaction, i.e. hydroxides and salts of weak acids of alkali and alkaline earth metals as well as amines and ammonia. NaOH, KOH, waterglass, ammonia and amines, in particular a combination of volatile and fixed compounds, are preferred. Volatile substances having an alkaline reaction should be understood to mean substances which have a pH of >7 in aqueous solution and volatize at room temperature or slightly elevated temperatures. The ratio of volatile to fixed compounds having an alkaline reaction should be in the region of 10:1 to 1:10, preferably in the region of 2:1 to 1:2.

The concentration of the compounds having an alkaline reaction as a whole is preferably in the region of 5 to 15 wt. %.

The pH of the cleaning agent should be above 12, preferably above 13, in particular in the region of 13.5 to 14.0.

The term complexing agents should be understood to mean compounds which are capable of complexing and masking metals. These include in particular Na salts or ammonium salts of diethylenetriamine pentaacetic acid (DTPA), hydroxyethylenediaminetriacetic acid (HEDTA), propylenediaminetetraacetic acid (PPTA), ethylenediaminetetraacetic acid (EDTA), nitrilotriacetic acid (NTA), citric acid, alanine diacetic acid, polyaspartic acid and methylglycidine diacetic acid as well as polycarboxylates and their mixtures. The preferred complexing agents are nitrilotriacetic acid-Na and alanine diacetic acid-Na. They are available on the market under the name Trilon A and Trilon M.

Preferably, the complexing agents are used in a concentration of 2 to 10 wt. %. Of particular importance is the weight ratio of complexing agents to substances having an alkaline reaction. It should be within the region of 2:1 to 1:8.

The compound with at least on hydroxyl group is an alcohol, in particular a higher alcohol. The number of hydroxyl groups is 1 to 12, preferably maximum 2. Higher alcohols should be understood to mean alcohols with 3 to 12 C atoms in the molecule. Concrete examples are benzyl alcohol and phenoxyethanol. However, ethers of polyols also belong to the higher alcohols, e.g. propylene glycol n-butyl ether, propylene glycol methyl ether, propylene glycol isobutyl ether and propylene glycol phenyl ether. The higher alcohols also include ethers of oligopropylene glycols such as dipropylene glycol methyl ether and tripropylene glycol methyl ether as well as ethyl or methyl diglycols. The glycols include in particular butyl glycol and butyl diglycol as well as ethylene glycol. These compounds with at least one hydroxyl group are preferably used in a quantity of 15 to 25%, individually or in mixture.

The fatty alcohols for the surfactants are above all fatty alcohols with 8 to 18, in particular 12 to 18 C atoms. However, oxy alcohols with 8 to 18, in particular 9 to 13 C atoms can also be used. These fatty alcohols are reacted with hydrophilic substances. In this way, fatty alcohols with 12 to 18 C atoms, for example, are etherified with 3 to 50 ethylene oxide units and, if necessary additionally with 1 to 15 propylene oxide units. The fatty alcohol alkoxylates can be used in a form with closed terminal groups. They can also be converted to fatty alcohol ether sulphates by sulphatising or to fatty alcohol sulphonates by sulphonation.

Glucose, for example, is another hydrophilic substance. Alkyl polyglycosides, e.g. Glucopon and Plantaren as well as Intensol are preferred.

The preferred concentration of the fatty alcohol surfactants is 2 to 8 wt. %. Apart from the fatty alcohol surfactants, rinsing auxiliary agents are also used.

The rinsing auxiliary agents are substances which are intended to achieve certain effects such as a solubilising mixture. In concrete terms, rinsing auxiliary agents are, on the one hand, phosphates and, on the other hand, sulphonates of the cumene and toluene sulphonate type. Phosphoric acid esters are also suitable rinsing auxiliary agents. Such substances are usually used as surfactants or builders in rinsing auxiliary agents. In concrete terms, the following deserve to be mentioned: pentasodium triphosphate, alkyl benzene sulphonate, alkane sulphonate and/or ester sulphonate.

In general, the water concentration is in the region of 20 to 80, in particular 50 to 60 wt. %.

Apart from these essential components of the cleaning agent, substances can be added in order to satisfy certain requirements in individual cases such as colorants, perfumes, builders.

The composition according to the invention is, surprisingly, highly suitable for cleaning PVC surfaces for subsequent adhesive bonding or coating. The adhesion on the PVC surface has been shown to become more resistant to the effect of heat and climatic fluctuations. This becomes particularly clear in the case of PVC profiles. PVC profiles are widely used as solid, hollow or core profiles because they are easy to manufacture by the extrusion process and because of their low costs and satisfactory application properties. The PVC used for this purpose can be flexible, semi-flexible or rigid PVC. To improve the properties and, above all, the appearance of the profiles, their surface is treated. PVC profiles are usually used in the building and furniture industry e.g. as skirting boards, kick strips, sliding rails, curtain rails, window frames, window seal fillets, door edges, door flames, roller blinds, balcony cladding, partitioning, panelling, façade cladding, stair edging, stair hand rails, edging for tables and doors etc. They are also used in the motor vehicle, refrigeration furnishings and appliance construction industry, e.g. as ornamental moldings as well as capping and seal profiles.

Appropriately, the PVC surfaces are cleaned with the composition according to the invention in the following way:

The cleaning agent is applied using the usual methods, e.g. by spraying or by means of a felt cloth, sponge, textile cloth, brush or doctor blade.

It is advantageous if the temperature is above room temperature since, in this case, cleaning can be intensified and shortened. The temperature of the cleaning agent should be between 10 and 80° C., preferably between 40 and 60° C.

The period of action of the cleaning agent according to the invention may be 1 second to 30 minutes.

The cleaning agent is rinsed off with running water. The rinsing water can be recycled.

After rinsing, the profile is dried with warm air, by thermal radiation or similar methods.

Advantageously, cleaning of the PVC surface with the alkaline cleaning agent takes place in a continuous process at rates of throughput of 1 to 25 ml/min. Cleaning can take place in line in a film laminating process. However, it is also possible to carry out a separate cleaning step and to effect film lamination after intermediate storage.

The cleaned PVC surface can be coated or adhesive bonded without any further pretreatment. Appropriately however, it is pretreated in the known way. Before adhesive bonding the cleaned PVC surfaces are optionally pretreated mechanically, physically, chemically or electrochemically. In particular by applying an adhesion promoter or primer, by flame treatment or by corona treatment. Corona sinface pretreatment, for example, is suitable for this purpose. By way of this treatment in an air atmosphere at normal pressure, the atomic layers in the surface of the profile are more or less strongly oxidized by high voltage discharge. In This way, the wetting and the adhesive properties are improved. A normal corona treatment is not possible on profiles. For this reason, corona treatment is preferably carried out according to the Softal process using Softal ionic or multi-ionic electrodes.

A further advantageous possibility of corona surface pretreatment is the general diffuse radiation system for plasma corona pretreatment as described by Argodyn Hochspannungstechnik GmbH. The corona is produced in the so-called corona jet and can be used in the same way as a hot-air hair dryer. It is also possible to treat profiles by passing them through a multiple arrangement of corona jets in a closed housing. In this way any desired profile can be pretreated on all sides.

A further important pretreatment method is flame treatment. It is carried out as usual.

A surface treatment with a primer, in particular a primer as described in WO 95/25138 is appropriate. This primer consists in a proportion of at least 20 wt. % of OH functional polyurethane prepolymers which are obtained by reacting polyester polyols (1) vis-à-vis isocyanates of at least doubly reactive compounds with groups capable of forming salts (II), tetramethylxylylene diisocyante (III), amino alcohols (IV) and, if necessary, a chain extender. The primer is suitable in particular for laminating PVC with films consisting of PVC, PES, polyolefins and polymethacrylates. Appropriately, a reactive polyurethane melt adhesive is used as the adhesive.

A further advantageous primer is based on chlorinated polyolefins (component A) to which water-emulsifiable isocyanates (component B) can be added, if necessary. When using isocyanate-containing adhesives, e.g. polyurethane hot melt adhesives, the use of the isocyanate-containing component B can be omitted.

"Chlorinated polyolefms" should be understood to consist of chlorinated polymers with the general structure $(-CH_2CR^1R^2)_n$ in which $R^1$ represents hydrogen and $R^2$ hydrogen, a straight-chain or branched saturated aliphatic or cycloaliphatic group or an unsaturated group such as a phenyl radical with a maximum of 24, in particular 20 C atoms. In concrete terms, such polyolefins are: polyethylene, polypropylene, polybutylene, polyisobutene, polyhexene, polyoctene, polydecene and polyoctadecene as well as polystyrene. Chlorinated polyolefins are obtained by chlorinating these polymers and/or polymerising monomers already containing chlorine such as vinyl chloride and vinylidene chloride. The following deserve to be mentioned as chlorinated polyolefins: chlorinated polyethylene and chlorinated polypropylene with a chlorine content of approximately 25 to 50 wt. % as well as chlorinated polyvinyl chloride with a chlorine content of approximately 60 to 70 wt. %. Aqueous solutions of chlorinated polyolefins are available on the market, e.g. under the trade name "Trapylen". The dispersions contain the chlorinated polyolefin such that their solids content is approximately 15 to 30 wt. %. They are stable in storage and in some cases contain a solubilizer such as n-butanol.

"Water-emulsifiable isocyanates" should be understood to consist of esters of isocyanic acid which are practically incapable of reacting with water at room temperature without catalysts. Particularly appropriate are polyisocyanates with 2 to 3 isocyanate groups per molecule. The isocyanates can also be produced by a prior reaction of a polyisocyanate with a diol or a diamine, a shortfall being used (isocyanate prepolymers). The following water-emulsifible isocyanates deserve to be mentioned: isocyanate biuret, PEG modified hexamethylene diisocyanate, which can be obtained from BASF under the trade name Basonat, and polyisocyanate based on hexamethylene diisocyanate obtainable from Bayer under the trade name Desmodur DA.

Appropriately, the primer contains components A & B in a combined concentration of 5 to 30, preferably of 8 to 20 wt. %. The ratio of components A to B can vary within wide limits, e.g. 80:20 to 20:80 parts by weight of component A or component B, based on the sum total of components A+B.

In addition, the primer may contain conventional additives with a thixotropic, pigmenting, filler and/or stabilising effect. Of particular importance are additives which improve wetting of the aqueous dispersion on the non-polar plastics and colorants to identify the treatment with the primer according to the invention.

Such a primer is described in German patent application DE 44 28 382.

The surface pretreated in this way is coated, e.g. with a lacquer or with an adhesive, in the case of an adhesive bond the adhesive being appropriately applied onto the film to be bonded. Both in the case of the lacquers and the adhesives, basically all commonly used mixtures of substances are suitable. As regards adhesives, examples that can be mentioned are diffusion adhesives on the basis of tetrahydrofuran and 10 to 20% PVC, reactive adhesives based on epoxides, polyurethane, polymethyl methacrylate or unsaturated polyesters as well as polyurethane melt adhesives. Polyurethane melt adhesives are preferred. In this case, film lamination can be carried out entirely without solvents. Appropriately, reactive, moisture-curing polyurethane melt adhesives are used.

The adhesives are applied in line with the operating instructions; PU melt adhesive, for example, is applied with a slit die or a roller at temperatures of approximately 110 to 150° C. The open time of the melt adhesive can be extended by heating, e.g. with hot air. The decorative film coated with the adhesive is pressed down onto the pretreated PVC surface.

There are no particular requirements regarding the film, either as to its thickness or the type of polymer used. The thickness is mainly a question of price and ease of handling. The film can be very thin, e.g. less than 0.25 mm thick (=film). However, it can also be very thick, i.e. up to 40 mm thick (=sheet). Preferably, the thickness is in the region of 0.1 to 1.0 mm. Apart from polyvinyl chloride, the following polymers are also suitable, among others: polyesters, polyethylene, polypropylene, polyacrylates and polymethyl methacrylates. If PVC or polyolefin films are used, e.g. those consisting of isotactic polypropylene or of PE/PP compounds, these can be treated in the same way as the substrate body. The decorative layer can also be obtained by laminating a metal layer onto a laminate.

The process for encasing a PVC window profile, for example, in a decorative PVC film thus comprises in general terms the following stages:

1. Cleaning of the PVC window profile using the alkaline aqueous cleaning agent according to the invention.
2. Preferably, the cleaned profile is activated by at least one of the usual pretreatments such as flame treatment, plasma radiation treatment, corona discharge or primer application.
3. The adhesive, in particular a moisture-reactive PU melt adhesive, is applied onto the film as usual.
4. During the open time, the decorative film, in particular a decorative film of PVC, is pressed onto the pretreated PVC profile.
5. The adhesive hardens.

In this way, adhesive bonds are obtained which exhibit high values not only initially but also following the action of heat and climatic changes.

The invention will now be described in detail.

EXAMPLES

I. Starting material
1. PVC profile: window profile (white) from Thyssen-Polymer
2. PVC film: MBAS, 0.2 mm from Renolit
3. Adhesive: polyurethane melt adhesive Purmelt QR 5300 from Henkel KGaA
4. Cleaning agent
   a) Solvent primer based on methylene chloride (>95%)
   b) Alkaline cleaning agent

| | |
|---|---|
| Alkali: | 8 wt. % of potassium hydroxide, ethanol amine, ammonia |
| Complexing agent: | 2 wt. % of NTA-Na, alanine dienic acid-Na |
| Alcohol: | 18 wt. % be weight of butyl glycol, phenoxyethanol |
| Surfactant: | 5 wt. % of fatty alcohol + 9 EO |
| Rinsing auxiliary agent: | 4 wt. % of cumene sulphonate |
| Other additives: | 2 wt. % of colorants, perfumes |
| the remainder being water | |

5. Aqueous primer: Type 404 from Dorus Klebetechnik

II. Samples Preparation
1. Surface treatment
   a) Alkaline cleaning agent
      Approximately 20 g/m² of the alkaline cleaning agent were applied by hand using a felt cloth and rinsed off with tap water after the period of action. Subsequently, drying was effected by blowing on hot air. The pretreatment method and the period of action and temperature of the alkaline cleaning agent were varied (compare table).
   b) Methylene chloride: the solvent primer was applied by hand using a felt cloth and dried by blowing with hot air.
   c) Flame treatment: The flame treatment device made by Agrotec was used with the following setting: ratio of air to propane=25/1.
   d) Corona treatment: The corona device made by Agrodyn was used with the following setting: setting of impulse discharge 20 kV and a frequency of 40 kHz.
   e) Aqueous primer: this was applied in the same way as the solvent primer.

III. Adhesive Bonding

Immediately after this treatment, a film was bonded onto the profiles pretreated in this way by passing them through a profile jacketing machine. The preparation of the sample bodies for the tests described in the following took place in a profile jacketing machine available from FRIZ.

The polyurethane melt adhesive was applied onto the film on this machine by means of a melt adhesive doctor blade device. Via a roller system, the adhesive-coated film was then laminated onto the pretreated profile by passing it through the roller system. In these tests, the following test conditions were maintained:

| | |
|---|---|
| Rate of feed of the profile jacketing machine during film lamination | 20 m/min |
| Temperature of the adhesive in the doctor blade: | 130° C. |
| Surface temperature of the profile before adhesive bonding: | 50° C. |
| Thickness of the adhesive applied by the doctor blade: | 0.04 mm |

The profile sections thus obtained were stored for 7 days in a normal climate (20° C./60% relative atmospheric humidity) to allow the polyurethane melt adhesive used to fully react to reach its final strength. Subsequently, the following tests were carried out on these profile bodies:

IV. Adhesive Properties

1. Peel Strength:

This was determined on strips of film 20 mm wide, in line with RAL-GZ 716/1, section 1, part 7.

a) after 0 climatic change cycles and
b) after 20 climatic change cycles
1 cycle involving the following treatment:
8 hours storage at 70° C. and 95% relative atmospheric humidity
8 hours storage at −20° C.
8 hours storage at 50° C. and 30% relative humidity 2. Visual assessment after storage at 150° C. after 30 minutes.

3. Abbreviations:
   FT=film tearing without peeling
   P=peeling
   FD=film detachment 4. Values required:
   According to RAL-GZ 716/1, section 1, part 7, the requirements regarding the durability of the film laminate are as follows:

| | |
|---|---|
| peel strength: | >2.5 N/mm |
| thermal storage test: | No blister formation |
| | No film detachment |
| peel strength after artificial weathering: | >2.0 N/mm |

V. Results

Even after simple cleaning with the cleaning agent according to the invention, a better durability of the adhesive bond is obtained than with the previously known surface treatments.

This advantageous effect is further enhanced by combination with known surface treatments.

TABLE

| | | Surface treatment | | Adhesive properties | | | |
|---|---|---|---|---|---|---|---|
| | | | Effect | | Peel strength | Visual assessment after thermal treatment (30 min, 150° C.) | |
| | | | Period | Temp | 0 cycles | 20 cycles | |
| Example | Type | | (sec) | (° C.) | N/mm | N/mm | Blisters | Detachment |
| 3 | Methylene chloride primer | | | | 4.0 FT | 2.6 P | Some small blisters | none |
| 2 | Flame treatment | | | | 3.8 partial FT | 1.0 P | none | none |
| — | Corona | | | | 1.0 | 0 | none | partial |
| — | Aqueous primer | | | | 3.2 FT | 2.5 partial FT | none | partial |
| 4 | Alkaline cleaning agent | | 30 | 20 | 3.6 P partial FT | 3.7 Partial P, FT | none | partial |
| 5 | Alkaline cleaning agent | | 5 | 60 | 3.8 P partial FT | 3.8 FT | none | none |
| 6 | Alkaline cleaning agent Aqueous primer | | 30 | 20 | 4.1 FT | 4.2 FT | none | none |
| 7 | Alkaline cleaning agent Flame treatment | | 30 | 20 | 4.1 FT | 4.0 FT | none | none |
| 8 | Alkaline cleaning agent Corona | | 30 | 20 | 5.0 FT | 4.1 FT | none | none |

What is claimed is:

1. A method of adhesive bonding a PVC surface to a substrate, the method comprising:
   cleaning a PVC surface with an aqueous alkaline composition comprising:
   A) 2 to 30 wt. % of a compound different from complexing agent (B) and rinsing auxiliary agent (E) and having an alkaline reaction in an aqueous medium,
   B) 1 to 30 wt. % of a complexing agent compound different from compound (A) and rinsing auxiliary agent (E),
   C) 5 to 40 wt. % of a compound with at least one hydroxyl group selected from the group consisting of alcohols and ethers of alcohols wherein the alcohol contains 3 to 12 carbon atoms,
   D) 1 to 15 wt. % of a surfactant based on fatty alcohols,
   E) 1 to 30 wt. % of a rinsing auxiliary agent compound different from compound (A) and compound (B), and
   F) 0 to 8 wt. % of water-soluble colorants and builders; and
   applying an adhesive to either the cleaned PVC surface or the substrate and bonding the PVC surface and the substrate together.

2. The method of claim 1 further comprising the step of pretreating the cleaned PVC surface prior to contacting the adhesive with the PVC surface.

3. The method of claim 2 wherein the pretreating step is selected from the group consisting of flame treating the cleaned PVC surface, plasma radiation treating the cleaned PVC surface and corona treating the cleaned PVC surface.

4. The method of claim 1 wherein the step of applying an adhesive comprises applying a moisture-reactive polyurethane melt adhesive.

5. The method of claim 1 wherein the step of cleaning a PVC surface comprises contacting the PVC surface with the aqueous alkaline composition for a period of from about 1 second to about 30 minutes.

6. The method of claim 1 wherein the step of cleaning a PVC surface comprises contacting the PVC surface with the aqueous alkaline composition at a temperature in the range of 10° C. to 80° C.

7. The method of claim 1 wherein the compound with at least one hydroxyl group of component (C) of the aqueous alkaline composition is present at a concentration of 15 to 25 weight %.

8. The method of claim 1 wherein the compound having an alkaline reaction in an aqueous medium of component (A) of the aqueous alkaline composition is selected from the group consisting of NaOH, KOH, waterglass, ammonia, amines, and mixtures thereof.

9. The method of claim 1 wherein the compound having an alkaline reaction in an aqueous medium of component (A) of the aqueous alkaline composition is present at a concentration of 5 to 15 wt. %.

10. The method of claim 1 wherein the aqueous alkaline composition has a pH above 12.

11. The method of claim 1 wherein the aqueous alkaline composition has a pH of 13.5 to 14.

12. The method of claim 1 wherein the complexing agent of component (B) of the aqueous alkaline composition is selected from the group consisting of Na salts or ammonium salts of diethylenetriamine pentaacetic acid, hydroxyethylenediaminetriacetic acid, propylenediaminetetraacetic acid, ethylenediaminetetraacetic acid, nitrilotriacetic acid, citric acid, alanine diacetic acid, polyaspartic acid, methylglycidine diacetic acid, polycarboxylates and mixtures thereof.

13. The method of claim 1 wherein the complexing agent of component (B) of the aqueous alkaline composition is present at a concentration of 2 to 10 wt. %.

14. The method of claim 1 wherein the compound with at least one hydroxyl group of component (C) of the aqueous alkaline composition is selected from the group consisting of benzyl alcohol, phenoxyethanol, propylene glycol n-butyl ether, propylene glycol methyl ether, propylene glycol isobutyl ether, propylene glycol phenyl ether, dipropylene glycol methyl ether, tripropylene glycol methyl ether, ethyl diglycols, methyl diglycols, butyl glycol, butyl diglycol, ethylene glycol and mixtures thereof.

15. The method of claim 1 wherein the surfactant based on fatty alcohols of component (D) of the aqueous alkaline composition comprises fatty alcohols having 12 to 18 carbon atoms esterified with 3 to 50 ethylene oxide units, and, optionally 1 to 15 propylene oxide units.

16. The method of claim 1 wherein the surfactant based on fatty alcohols of component (D) of the aqueous alkaline composition is present at a concentration of 2 to 8 wt. %.

17. The method of claim 1 wherein the rinsing auxiliary agent of component (E) of the aqueous alkaline composition is selected from the group consisting of phosphates, cumene and toluene sulphonates, alkylbenzene sulphonates, alkane sulphonates, ester sulphonates, and phosphoric acid esters.

* * * * *

UNITED STATES PATENT AND TRADEMARK OFFICE
CERTIFICATE OF CORRECTION

PATENT NO. : 6,793,760 B2
DATED : September 21, 2004
INVENTOR(S) : Hoffmann et al.

It is certified that error appears in the above-identified patent and that said Letters Patent is hereby corrected as shown below:

<u>Title page,</u>
Item [75], Inventors, delete "Bonfingen" and insert -- Bopfingen --.

Signed and Sealed this

Eleventh Day of April, 2006

JON W. DUDAS
*Director of the United States Patent and Trademark Office*